US008178138B2

(12) United States Patent
Hendel et al.

(10) Patent No.: US 8,178,138 B2
(45) Date of Patent: *May 15, 2012

(54) RUMINANT FEEDSTOCK DIETARY SUPPLEMENT

(75) Inventors: Robert A. Hendel, Chalfont, PA (US); Edward A. Roman, New Egypt, NJ (US); Steven A. Bolkan, Hopewell, NJ (US); William J. Zuccarello, Cream Ridge, NJ (US); Zbigniew Senk, Bayonne, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 306 days.

This patent is subject to a terminal disclaimer.

(21) Appl. No.: 12/420,898

(22) Filed: Apr. 9, 2009

(65) Prior Publication Data
US 2009/0252837 A1 Oct. 8, 2009

Related U.S. Application Data

(63) Continuation-in-part of application No. 11/473,880, filed on Jun. 23, 2006, now Pat. No. 7,939,117.

(51) Int. Cl.
*A23K 1/18* (2006.01)
(52) U.S. Cl. ........... 426/74; 426/302; 426/656; 426/807
(58) Field of Classification Search ..................... 426/74, 426/656, 302, 807
See application file for complete search history.

(56) References Cited

U.S. PATENT DOCUMENTS

| 4,138,348 A | * | 2/1979 | Grasshoff ..................... 508/157 |
| 4,196,187 A | * | 4/1980 | Dannelly et al. .............. 424/489 |
| 4,212,890 A | | 7/1980 | Tiefenbacher et al. |
| 4,384,004 A | | 5/1983 | Cea et al. |
| 4,595,584 A | | 6/1986 | Wu et al. |
| 4,842,863 A | | 6/1989 | Nishimura |
| 4,887,621 A | | 12/1989 | Vallieres |
| 4,948,589 A | | 8/1990 | Iijima |
| 4,996,067 A | | 2/1991 | Kobayashi |
| 5,023,091 A | | 6/1991 | Winowiski |
| 5,064,665 A | | 11/1991 | Kopfenstien |
| 5,093,128 A | | 3/1992 | Draguesku |
| 5,225,238 A | | 7/1993 | Ardaillon et al. |
| 5,227,166 A | | 7/1993 | Ueda et al. |
| 5,571,527 A | | 11/1996 | Nishimura |
| 5,585,134 A | | 12/1996 | Cummings et al. |
| 5,633,004 A | | 5/1997 | Nishimura |
| 5,635,198 A | | 6/1997 | Nishimura |
| 5,871,802 A | | 2/1999 | Gao et al. |
| 5,874,102 A | | 2/1999 | Lajoie et al. |
| 5,885,610 A | | 3/1999 | Anderson |
| 6,203,829 B1 | | 3/2001 | Morikawa |
| 6,306,427 B1 | | 10/2001 | Annonier |
| 2004/0202695 A1 | | 10/2004 | Moore |
| 2006/0045957 A1 | | 3/2006 | Bevans et al. |
| 2008/0008779 A1 | | 1/2008 | Zuccarell et al. |

FOREIGN PATENT DOCUMENTS

| GB | 2113521 A | * | 8/1983 |
| JP | 07213235 | | 8/1995 |
| WO | WO2004/080197 | | 9/2004 |

OTHER PUBLICATIONS

Canale, et al., "Dietary Fat and Ruminally Protected Amino Acids for High Producing Dairy Cows", Journal of Dairy Science, (1990), 135-141, 73, A.D.S.A., Savoy, IL.
Donkin, et al., "Rumen-Protect Methionine and Lysine: Effects on Animal Performance, Milk Protein Yield, and . . . ," Journal of D.S., (1989), 1484-1491, 72, A.D.S.A., Savoy, IL.
Polan, et al., "Responses of Dairy Cows to Supplemental Rumen-Protected Forms of Methionine and Lysine," Journal of Dairy Science, (1991), 2997-3013, 74, A.D.S.A., Savoy, IL.
Rogers, et al, "Plasma Amino Acids and Milk Protein Production by Cows Fed Rumen-Protected Metheionine and Lysine," Journal of D.S., (1987), 789-798, 70, A.D.S.A., Savoy, IL.
Rogers, et al., "Production Responses of Dairy Cows Fed Various Amounts of Rumen-Protected Methionine and Lysine," Journal of D.S., (1989), 1800-1817, 72, A.D.S.A., Savoy, IL.

* cited by examiner

*Primary Examiner* — Chhaya Sayala
(74) *Attorney, Agent, or Firm* — Frenkel & Associates, P.C.; Stephen B. Shear

(57) ABSTRACT

This invention provides a control release formulation or rumen-bypass dietary supplement in compacted form. The formulation or supplement has the capability to transport fatty acid calcium salt and between about 1-75 percent of one or more rumen-protected undegraded biologically active agents to the post-ruminal digestive system of a ruminant. A feedstock containing the formulation or supplement for ruminants beneficially improves feed efficiency and body growth. The feedstock also is adapted to improve the lactational performance of dairy cattle.

13 Claims, No Drawings

RUMINANT FEEDSTOCK DIETARY SUPPLEMENT

CROSS REFERENCE TO RELATED APPLICATION

The present application is a continuation-in-part of currently U.S. Ser. No. 11/473,880 filed Jun. 23, 2006, now U.S. Pat. No. 7,939,117, entitled, "Ruminant Feedstock Dietary Supplement", which is incorporated herein by reference.

FIELD OF THE INVENTION

This invention generally relates to a control release formulation that is supplemented with a rumen-bypass protected biologically active content. More specifically, in preferred embodiments this invention relates to ruminant feedstocks for domesticated ruminants which are capable of delivering undegraded essential aminoacids such as lysine and methionine to the post-rumen digestive system of ruminants such as dairy cattle.

BACKGROUND OF THE INVENTION

Publications cited in the present specification are incorporated by reference.

When a feedstock for ruminants has a content of biologically active constituent, a substantial amount of the said constituent (e.g., protein, aminoacids, and the like) is degraded to ammonia or carbon dioxide gas by microorganisms in the rumen. This prevents effective utilization of the administered biologically active constituent in the feedstock.

When special nutrients or medicaments are administered to ruminants, it is essential to protect these ingredients from decomposition in the rumen. The objective is to pass the said ingredients through the rumen to the omasum, and subsequently to the abomasum and absorption by the small intestine.

There are ongoing research and development activities which are seeking to achieve ruminant feedstock supplements which have the desired rumen-bypass properties. Rumen-bypass formulations are reported in numerous publications such as U.S. Pat. Nos. 4,842,863; 4,948,589; 5,023,091; 5,064,665; 5,093,128; 5,571,527; 5,633,004; 5,635,198; 6,203,829 and 6,306,427. There is further disclosure in WO2004/080197-A2 (PCT) and references cited therein.

Special effort has been directed to achieving rumen-bypass protection for essential aminoacids which supplement feedstocks for milk-producing ruminants.

It is known that lysine and methionine are important for milk production in dairy cattle. Journal of Dairy Science, 70, 789 (1987) reports that rumen-protected lysine increased feed intake, milk yield and 4% fat-corrected milk production in dairy cows; rumen-protected methionine and lysine increased production of milk protein in dairy cows.

Similar results are reported in Journal of Dairy Science, 72, 1484 (1989); 72, 1800 (1989); 73, 135 (1990); and 74, 2997 (1991). Data also indicated that added fat increased the percentage and yield of long-chain fatty acids in cow milk. Adding ruminally-protected aminoacids to fat-supplemented diets appeared to alleviate the milk protein depression observed with added lipids in feedstock.

Because of the significant economic consequences of rumen-bypass undegraded dietary nutrient transport, there is continuing interest in the development of superior rumen-bypass feedstock supplements to promote these prospective advantages.

Accordingly, it is an object of this invention to provide ruminant feedstocks which are supplemented with a rumen-protected biologically active content for advancing ruminant husbandry and for providing value added meat and dairy products for human consumption.

It is another object of this invention to provide rumen-bypass dietary supplements to stabilize and maintain the health of ruminants, and to improve the lactational performances of dairy ruminants.

It is yet another object of this invention to provide rumen-bypass dietary supplements which deliver post-rumen undegraded aminoacids in milk-producing dairy cattle for increased milk yield and increased production of milk protein.

It is a further object of this invention to provide an efficient process for producing a rumen-bypass dietary supplement in compacted particulate form, which supplement has the capability of passing between about 20-99 percent of its rumen-protected biologically active content to the post-rumen digestive system of ruminants.

Other objects and advantages of the present invention shall become apparent from the accompanying description and example data.

SUMMARY OF THE INVENTION

The present invention discloses a control release formulation (e.g., a rumen-bypass dietary supplement) in compacted form. In one embodiment, the control release formulation (or supplement) has the capability to transport a fatty acid salt (e.g., a fatty acid calcium salt) and one or more rumen-protected undegraded biologically active agents (e.g., an aminoacid) to the post-ruminal digestive system of a ruminant. In accordance with the present invention, the rumen-bypass dietary supplement comprises: (a) a fatty acid salt; (b) one or more biologically active agents; (c) a free alkali metal salt and/or a free alkaline earth metal salt; and (d) a binder. In one embodiment, under ruminant feeding conditions the dietary supplement has the capability to transport between about 20-99 percent of one or more rumen-protected undegraded biologically active agents (e.g., an aminoacid) to the post-rumen digestive system of a ruminant.

In another embodiment, the present invention provides a process for producing a rumen-bypass dietary supplement comprising: (1) blending a fatty acid salt (e.g., an alkaline earth metal salt) and one or more biologically active agents to form solid central core particles; (2) compacting the core particles to form pellets; (3) optionally coating the pellets with a liquid carboxylate salt-forming fatty acid constituent and/or a liquid carboxylate salt; and (4) optionally applying one or more additional coatings to the pellets with a constituent comprising a basic inorganic alkaline earth metal compound to create an in situ reactive carboxylate salt-forming matrix.

DETAILED DESCRIPTION OF THE INVENTION

One or more objects of the present invention are accomplished by the provision of a control release formulation (e.g., a rumen-bypass dietary supplement) in compacted form comprising:

(a) a fatty acid salt, for example, a $C_4$-$C_{24}$ fatty acid alkaline earth metal salt;

(b) one or more biologically active agents, for example, an amino acid, vitamin, mineral, trace elements, enzyme, protein, non-protein nitrogen compound, medicaments, or mixtures thereof;

(c) a free alkali, for example, hydroxide and/or carbonates of alkali metals, and/or alkaline earth metals;

(d) a binder, for example, a $C_4$-$C_{24}$ fatty acid carboxylate-salt forming constituent; and (e) optionally one or more additional coatings.

Other constituents may be included in the compacted formulation including, but not limited to, inorganic acidic salts, clays and other inorganic and organic-based compounds, either dispersed throughout or applied to the exterior of the compacted materials.

In one embodiment, the control release formulation of the present invention can be in compacted particulate form wherein the particles have average dimensions between about 2-5 millimeters, and a density between about 1-1.3 grams per cubic centimeter. In another embodiment, under ruminant feeding conditions control release formulation of the present invention has the capability to transport between 20-99 percent of one or more rumen-protected undegraded biologically active agents (e.g., an aminoacid) to the post-rumen digestive system of a ruminant.

Standard procedures and equipment are employed to blend ingredients, compact ingredients, and apply coatings as appropriate. Granules or pellets are coated by conventional means such as pan coating, fluidized coating, centrifugal fluidized coating, and the like.

A present invention dietary supplement can be in the form of spherical, elliptical or cylindrical pellets which are in compacted form. Production of compressed solids can be facilitated with commercially available pellet mills and extruders, supplied by companies such as Sprout-Matador (Muncy, Pa.) and Roskamp Champion (Waterloo, Iowa).

In a preferred embodiment this invention provides a rumen-bypass dietary supplement in compacted particulate form comprising:

(a) between about 50-90 weight percent of $C_4$-$C_{24}$ fatty acid alkaline earth metal salt;

(b) between about 5-50 weight percent of one or more biologically active agents;

(c) between about 0.2-5 weight percent of a free alkali salt and/or an alkaline earth metal salt; and (d) between about 0.5-20 weight percent of a $C_4$-$C_{24}$ fatty acid carboxylate-salt forming fatty acid; and (e) optionally one or more coatings.

The central core of a typical control release formulation or dietary supplement particle (e.g., in pellet form) comprises a blend of one or more biological active agents (e.g., an aminoacid), a fatty acid salt (e.g., a fatty acid calcium and/or magnesium salt), a free alkali metal salt and/or an alkaline earth metal salt and a binder. In an optional embodiment, of the present invention, one or more additional or external coatings can be applied to the central core of the control release formulation. For example, a liquid fatty acid coating can be applied to the surface of the central core, and the separate application of a basic inorganic reagent such as calcium hydroxide can be added to the same central core surface. Either coating can be applied first and the liquid fatty acid and the basic inorganic reagent may be combined together to form the reactive matrix for subsequent application on the surface of the pellet. The super-imposed coatings may constitute a reactive matrix, and the in-situ matrix can transform into an interlocking network of multi-valent fatty acid salts. The resultant periphery of the pellet structure is a bonded hard lamina which imparts superior rumen-bypass properties to an invention dietary supplement for incorporation in ruminant feedstocks. In addition, the liquid fatty acid and the basic inorganic reagent may be combined together to form the reactive matrix for subsequent application on the surface of the pellet.

As another optional modification, the hereinabove described central core of a typical control release formulation or dietary supplement particle (e.g., in pellet form) can be encapsulated with an outer coating for additional rumen-bypass capability. Suitable coating substrates include waxes and polymers which can form a continuous film that functions as a semi-permeable barrier to a ruminal medium. This type of coating subsequently is capable of being at least partially disintegrated in the strongly acidic condition of the gastric fluid in the abomasum of ruminants.

Useful coating materials include carnauba wax, beeswax, polyvinylpyrrolidone, polyacrylamide, poly(styrene/2-vinylpyridine), polyvinyl acetate, shellac, zein, benzylaminomethylcellulose, ethylcellulose, cellulose acetate, and the like, and coating materials disclosed in U.S. Pat. Nos. 4,194,013; 4,384,004; 4,887,621; and 4,996,067.

The control release formulation of the present invention comprises a fatty acid salt. In one embodiment, the fatty acid salt can be a $C_4$-$C_{24}$ fatty acid calcium and/or magnesium salt. The fatty acid salt of the control release formulation of the present invention may comprise from about 25 to about 99 weight percent, from about 50 to about 90 weight percent, or from about 60 to about 75 weight percent, of a fatty acid salt. In another embodiment, the fatty acid salt can be $C_{12}$-$C_{22}$ fatty acid calcium and/or magnesium salt.

The control release formulation of the present invention comprises one or more biologically active agents. The one or more biologically active agents of the control release formulation may comprise from about 1 to about 75 weight percent, from 5 to about 50 weight percent, or from about 10 to about 40 weight percent, of one or more biologically active agents. In one embodiment, one or more biologically active agents can be one or more amino acids, vitamins, minerals, trace elements, enzymes, proteins, non-protein nitrogen compounds, medicaments, or mixtures thereof.

When the one or more biologically active agents is an aminoacid, the essential aminoacids are of special interest. Preferred aminoacids include alanine, glycine, lysine, methionine, methionine hydroxy analog, tryptophan, arginine, threonine, valine, leucine, isoleucine, histidine, phenylalanine, glutamine and glutamic acid.

For lactating dairy cattle feedstocks, a preferred control release formulation or dietary supplement is one that delivers high levels of post-rumen contents of $C_{12}$-$C_{22}$ fatty acids and one or more of lysine, methionine, methionine hydroxy analog and tryptophan.

In one embodiment, the control release formulation (e.g., a dietary supplement) of the present invention can have a varied combination of biologically active ingredients, for example, the formulation may contain from about 1-75 weight percent of an aminoacid and/or from about 0.1-30 weight percent of one or more active ingredients selected from vitamins, trace elements, proteins, non-protein nitrogen compounds, medicaments, enzymes, inorganic acidic salts, clays, and the like.

Vitamins either singly or in combination include thiamine HCl, riboflavin, pyridoxine HCl, niacin, biotin, folic acid, ascorbic acid, vitamin $B_{12}$, vitamin A acetate, vitamin K, vitamin D, vitamin E, and the like.

Trace elements include compounds of cobalt, copper, manganese, iron, zinc, tin, iodine, vanadium, selenium, and the like.

Protein ingredients are obtained from sources such as dried blood or meat meal, cottonseed meal, soy meal, dehydrated alfalfa, dried and sterilized animal and poultry manure, fish meal, powdered eggs, canola meal, and the like.

Protein equivalent ingredients include urea, biuret, ammonium phosphate, and the like.

Medicament ingredients either singly or in combination include promazine hydrochloride, chlorotetracycline, sulfamethazine, monensin, poloxalene, and the like. Oxytetracycline is a preferred antibiotic for cattle prophylaxis.

Enzymes of choice include lipolytic proteins which aid feed digestibility, e.g., by hydrolysis of fatty acid glycerides to free fatty acid and glycerol.

As illustrated in the Examples, this invention further provides a process for producing the range of rumen-bypass dietary supplements described hereinabove.

As disclosed hereinabove, the core compacted particle comprises a blend of one or more biologically active agents (e.g., an amino acid) and a fatty acid salt (e.g., a calcium and/or magnesium salt). The inventors have surprisingly found that by using a binder or reactant in the formation of the core compacted particle, superior rumen-bypass can be achieved. As such, in one embodiment, the use of a binder or reactant can be used in the process for producing the control release formulation (or the rumen-bypass dietary supplement) of the present invention. The binder can be, but is not limited to, a carboxylate salt-forming $C_4$-$C_{24}$ fatty acids. In the practice of this embodiment, an excess of free alkali is typically used in the formation of the fatty acid calcium and/or magnesium salt. The free alkali can be a hydroxide and/or carbonate of an alkali metal salt or alkaline earth metal salt (e.g., $Ca(OH)_2$ or $Mg(OH)_2$). Typically, the free alkali comprises from about 0.2 to about 10 weight percent of the total weight of the fatty acid salt. In another embodiment, the free alkali content is between about 0.2 and about 5 weight percent, or from about 0.2 to about 2 weight percent, of the total weight of the fatty acid salt used. While not wishing to be bound by theory, it is believed that by using an excess of a free alkali (e.g., $Ca(OH)_2$ or $Mg(OH)_2$), the excess free alkali (e.g., $Ca(OH)_2$ or $Mg(OH)_2$) is available for reaction, and can act as a reactant and interact with the binder or reactant in-situ to form a fatty acid salt encapsulate in and throughout the pellet (e.g., a Ca- or Mg-fatty acid salt encapsulate). Other sources of OH, $Ca^{2+}$ and $Mg^{2+}$ may be used, such as NaOH, KOH and other monovalent alkali metals alone and/or in the presence of metal salts such as $CaCl_2$ and $MgSO_4$, among others, as well as reaction products of CaO and $H_2O$ to yield $Ca(OH)_2$ and the reaction products of MgO and $H_2O$ to yield $Mg(OH)_2$. Thus, for example, this excess of $Ca(OH)_2$ and/or $Mg(OH)_2$ can act as a reactant and interact with the binder or reactant in-situ to form a Ca- and/or Mg-fatty acid salt encapsulate. In some embodiments, the use of excess free alkali and excess binder or reactant can result in the formation of a fatty acid salt coating on the compacted control release formulation of the present invention. In general, any known binder or reactant can be used in the practice of this invention. Typically, the reactant or binder is a free fatty acid or a carboxylate salt-forming $C_4$-$C_{24}$ fatty acids. Fatty acids useful for the practice of this invention include, but are not limited to, palm fatty acid distillate (PFAD), the individual or combination fatty acids found therein such as, palmitic acid, stearic acid, oleic acid, linoleic acid, and the like, and/or other fatty acid-containing mixtures. Such mixtures may comprise, but are not limited to, non-free fatty acid ether extractable fats and other materials, such as the mono-, di- and tri-gylceride forms of said groups. A free fatty acid content of from about 0.5% by weight to about 20% by weight of the core compacted particle can be used, and can include non-free fatty acid ether extractable fats and other materials. In yet another embodiment, the free fatty acid content can be from about 0.5% by weight to about 10% by weight of the core compacted particle, and can include non-free fatty acid ether extractable fats and other materials.

A volume of core particles as described can be compacted into pellets by conventional means such as extrusion. Any known pelletizer can be used, for example, any known pellet mill. The core particles are pressed into pellets by extrusion through a die. In the invention process elaborated above, either of the coatings can be the first applied to the pellets, or pre-mixed before application. As an optional step, the pellets then can be encapsulated with a final outer coating of wax or polymeric material to form a further semi-permeable barrier to a ruminal fluid.

The following Examples are further illustrative of the present invention. The components and specific ingredients are presented as being typical, and various modifications can be derived in view of the foregoing disclosure within the scope of the invention.

Example I

Calcium salt of palm fatty acid distillate flakes with $Ca(OH)_2$ (Megalac®, Church & Dwight Co., Inc., Princeton, N.J. USA) and L-lysine*HCl powder (as specified in Table 1) were batched and blended. The Megalac® used had a fat (petroleum ether extract) %, free fatty acid % (based on palmitic) and $Ca(OH)_2$% of ca. 5%, ca. 0.2% and ca. 2%, respectively. After mixing, the feed was fed to a CPM Master Model 1000 pellet mill via an auger feeder-conditioning chamber and pelletized. The resultant pellets were screened to remove fines and cooled via an air blower. Solubility leaching and in-sacco bag study leaching were used to gauge the control release of L-lysine from Megalac®-L-lysine*HCl-based pellets (see Table 1); if the Megalac®-L-lysine*HCl-based pellet is effective at mitigating the loss of the L-lysine from the pellet, then elevated L-lysine concentrations in the resultant pellets will result as compared to the non-pelleted blend, thus demonstrating the control release properties of the pellets. While it is desirable for enhancing rumen bypass L-lysine in this example, the control release formulation in terms of fatty acid reactant type and levels, hydroxide and/or carbonate of an alkali metal type and levels and the compaction extrusion process, among other factors, can be tailored accordingly to control, for example, fatty acid salt formation (degree of reaction), degree of compaction of the resultant extruded pellet, cohesiveness of the pellet, among other physical and chemical properties, which dictate the control release characteristics of the core materials.

Characterization—Solubility Leaching. The pellets were exposed to a phosphate buffer solution (ca. 0.2 M) at pH ca. 6.7 and at ca. 35° C. with subtle shaking. At 24 h the pellets were removed, washed with water and then dried. Pellets "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of pellets "after exposure")/(Weight of pellets "before exposure")]×100. SIF for Experiment 1 (Table 1)=15%.

In-sacco Bypass (ISB). Pellets housed in nylon bags were placed in the cow's rumen and exposed to the rumen fluid for 12 h. At 12 h, the pellets were removed from the rumen, rinsed with water and then dried. Pellets "before exposure" and "after exposure" were analyzed for N-content (Kjeldahl method) and the % bypass (% remaining)/In-sacco Bypass (ISB), was calculated as follows: ISB=[(N % "after exposure")/(N % "before exposure")]×[(Weight of pellets "after exposure")]/(Weight of pellets "before exposure")]×100. ISB for Experiment 1 (Table 1)=21%.

Experiment 1 of Table 1 includes some additional formulation details, processing details, experimental details and efficacy/characterization results.

Example II

Calcium salt of palm fatty acid distillate flakes with Ca(OH)$_2$ (Megalac®, Church & Dwight Co., Inc., Princeton, N.J. USA), L-lysine*HCl powder and additive (as specified in Table 1) were batched and blended. The Megalac® used had a fat (petroleum ether extract) %, free fatty acid % (based on palmitic) and Ca(OH)$_2$% of ca. 5%, ca. 0.2% and ca. 2%, respectively. Liquid stearic acid (Acros Organics N.V., Fair Lawn, N.J.) was then added to the dry blend and blended for 2 minutes. The stearic acid used had a fat (petroleum ether extract) % and free fatty acid % of ca. 100% and ca. 100%, respectively. After mixing, the feed was fed to a CPM CL-3 pellet mill via an auger feeder and pelletized. The resultant pellets were screened to remove fines and cooled via an air blower. Solubility leaching and in-sacco bag study leaching were used to gauge the control release of L-lysine from Megalac®-L-lysine*HCl-additive-based pellets (see Table 1); if the Megalac®-L-lysine*HCl-additive-based pellet is effective at mitigating the loss of the L-lysine from the pellet, then elevated L-lysine concentrations in the resultant pellets will result as compared to the non-pelleted blend, thus demonstrating the control release properties of the pellets. While it is desirable for enhancing rumen bypass L-lysine in this example, the control release formulation in terms of fatty acid reactant type and levels, hydroxide and/or carbonate of an alkali metal type and levels and the compaction extrusion process, among other factors, can be tailored accordingly to control, for example, fatty acid salt formation (degree of reaction), degree of compaction of the resultant extruded pellet, cohesiveness of the pellet, among other physical and chemical properties, which dictate the control release characteristics of the core materials.

Characterization—Solubility Leaching. The pellets were exposed to a phosphate buffer solution (ca. 0.2 M) at pH ca. 6.7 and at ca. 35° C. with subtle shaking. At 24 h the pellets were removed, washed with water and then dried. Pellets "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of pellets "after exposure")]/(Weight of pellets "before exposure")]×100. SIF for Experiment 2 (Table 1)=38%.

In-sacco Bypass (ISB). Pellets housed in nylon bags were placed in the cow's rumen and exposed to the rumen fluid for 12 h. At 12 h, the pellets were removed from the rumen, rinsed with water and then dried. Pellets "before exposure" and "after exposure" were analyzed for N-content (Kjeldahl method) and the % bypass (% remaining)/In-sacco Bypass (ISB), was calculated as follows: ISB=[(N % "after exposure")/(N % "before exposure")]×[(Weight of pellets "after exposure")]/(Weight of pellets "before exposure")]×100. ISB for Experiment 2 (Table 1)=46%.

Experiment 2 of Table 1 includes some additional formulation details, processing details, experimental details and efficacy/characterization results.

Example III

Calcium salt of palm fatty acid distillate flakes with Ca(OH)$_2$ (Megalac®, Church & Dwight Co., Inc., Princeton, N.J. USA), L-lysine*HCl powder/granules and additive (as specified in Table 1) were batched and blended. The Megalac® used had a fat (petroleum ether extract) %, free fatty acid % (based on palmitic) and Ca(OH)$_2$% of ca. 5%, ca. 0.2% and ca. 2%, respectively. Palm fatty acid distillate (PFAD) liquid (PT Bukit Kapur Reksa, Indonesia) was then added to the dry blend and blended for 2 minutes. The PFAD used had a fat (petroleum ether extract) % and free fatty acid % of ca. 100% and ca. 81% (based on palmitic), respectively. After mixing, the feed was fed to a CPM CL-3 pellet mill via an auger feeder and pelletized. The resultant pellets were screened to remove fines and cooled via an air blower. Solubility leaching and in-sacco bag study leaching were used to gauge the control release of L-lysine from Megalac®-L-lysine*HCl-additive-based pellets (see Table 1); if the Megalac®-L-lysine*HCl-additive-based pellet is effective at mitigating the loss of the L-lysine from the pellet, then elevated L-lysine concentrations in the resultant pellets will result as compared to the non-pelleted blend, thus demonstrating the control release properties of the pellets. While it is desirable for enhancing rumen bypass L-lysine in this example, the control release formulation in terms of fatty acid reactant type and levels, hydroxide and/or carbonate of an alkali metal type and levels and the compaction extrusion process, among other factors, can be tailored accordingly to control, for example, fatty acid salt formation (degree of reaction), degree of compaction of the resultant extruded pellet, cohesiveness of the pellet, among other physical and chemical properties, which dictate the control release characteristics of the core materials.

Characterization—Solubility Leaching. The pellets were exposed to a phosphate buffer solution (ca. 0.2 M) at pH ca. 6.7 and at ca. 35° C. with subtle shaking. At 24 h the pellets were removed, washed with water and then dried. Pellets "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of pellets "after exposure")]/(Weight of pellets "before exposure")]×100. SIF for Experiment 3 (Table 1)=29%.

In-sacco Bypass (ISB). Pellets housed in nylon bags were placed in the cow's rumen and exposed to the rumen fluid for 12 h. At 12 h, the pellets were removed from the rumen, rinsed with water and then dried. Pellets "before exposure" and "after exposure" were analyzed for N-content (Kjeldahl method) and the % bypass (% remaining)/In-sacco Bypass (ISB), was calculated as follows: ISB=[(N % "after exposure")/(N % "before exposure")]×[(Weight of pellets "after exposure")]/(Weight of pellets "before exposure")]×100. ISB for Experiment 3 (Table 1)=43%.

Experiment 3 of Table 1 includes some additional formulation details, processing details, experimental details and efficacy/characterization results.

Example IV

Calcium stearate flakes (Baerlocher USA, Cincinnati, Ohio), L-lysine*HCl granules and additive (as specified in Table 1) were batched and blended. The calcium stearate used had a fat (petroleum ether extract) %, free fatty acid % and Ca(OH)$_2$% of ca. 0.3%, ca. 0.3% and ca. 0.1%, respectively. Liquid stearic acid (Acros Organics N.V., Fair Lawn, N.J.) was then added to the dry blend and blended for 2 minutes. The stearic acid used had a fat (petroleum ether extract) % and free fatty acid % of ca. 100% and ca. 100%, respectively. After mixing, the feed was fed to a CPM CL-3 pellet mill via an auger feeder and pelletized. The resultant pellets were screened to remove fines and cooled via an air blower. Solubility leaching and in-sacco bag study leaching were used to gauge the control release of L-lysine from Ca-stearate-L-lysine*HCl-additive-based pellets (see Table 1); if the Ca-stearate-L-lysine*HCl-additive-based pellet is effective at mitigating the loss of the L-lysine from the pellet, then elevated L-lysine concentrations in the resultant pellets will result as compared to the non-pelleted blend, thus demonstrating the control release properties of the pellets. While it is desirable for enhancing rumen bypass L-lysine in this example, the control release formulation in terms of fatty acid reactant type and levels, hydroxide and/or carbonate of an alkali metal type and levels and the compaction extrusion process, among other factors, can be tailored accordingly to control, for example, fatty acid salt formation (degree of reaction), degree of compaction of the resultant extruded pellet, cohesiveness of the pellet, among other physical and chemical properties, which dictate the control release characteristics of the core materials.

Characterization—Solubility Leaching. The pellets were exposed to a phosphate buffer solution (ca. 0.2 M) at pH ca. 6.7 and at ca. 35° C. with subtle shaking. At 24 h the pellets were removed, washed with water and then dried. Pellets "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of pellets "after exposure")]/(Weight of pellets "before exposure")]×100. SIF for Experiment 4 (Table 1)=4%.

In-sacco Bypass (ISB). Not completed due to the low solubility leaching result.

Experiment 4 of Table 1 includes some additional formulation details, processing details, experimental details and efficacy/characterization results.

Example V

Calcium salt of palm fatty acid distillate flakes with Ca(OH)$_2$ (Megalac®, Church & Dwight Co., Inc., Princeton, N.J. USA), L-lysine*HCl powder/granules and additive (as specified in Table 1) were batched and blended. The Megalac® used had a fat (petroleum ether extract) %, free fatty acid % (based on palmitic) and Ca(OH)$_2$% of ca. 5%, ca. 0.2% and ca. 2%, respectively. Liquid soy oil (Spectrum Organic Products, LLC, Petaluma, Calif.) was then added to the dry blend and blended for 2 minutes. The soy oil used had a fat (petroleum ether extract) % and free fatty acid % of ca. 100% and ca. 0.5%, respectively. After mixing, the feed was fed to a CPM CL-3 pellet mill via an auger feeder and pelletized. The resultant pellets were screened to remove fines and cooled via an air blower. Solubility leaching and in-sacco bag study leaching were used to gauge the control release of L-lysine from Megalac®-L-lysine*HCl-additive-based pellets (see Table 1); if the Megalac®-L-lysine*HCl-additive-based pellet is effective at mitigating the loss of the L-lysine from the pellet, then elevated L-lysine concentrations in the resultant pellets will result as compared to the non-pelleted blend, thus demonstrating the control release properties of the pellets. While it is desirable for enhancing rumen bypass L-lysine in this example, the control release formulation in terms of fatty acid reactant type and levels, hydroxide and/or carbonate of an alkali metal type and levels and the compaction extrusion process, among other factors, can be tailored accordingly to control, for example, fatty acid salt formation (degree of reaction), degree of compaction of the resultant extruded pellet, cohesiveness of the pellet, among other physical and chemical properties, which dictate the control release characteristics of the core materials.

Characterization—Solubility Leaching. The pellets were exposed to a phosphate buffer solution (ca. 0.2 M) at pH ca. 6.7 and at ca. 35° C. with subtle shaking. At 24 h the pellets were removed, washed with water and then dried. Pellets "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of pellets "after exposure")]/(Weight of pellets "before exposure")]×100. SIF for Experiment 5 (Table 1)=9%.

In-sacco Bypass (ISB). Not completed due to the low solubility leaching result.

Experiment 5 of Table 1 includes some additional formulation details, processing details, experimental details and efficacy/characterization results.

Example VI

Calcium salt of palm fatty acid distillate flakes with Ca(OH)$_2$ (Megalac®, Church & Dwight Co., Inc., Princeton, N.J. USA), L-lysine*HCl powder/granules and liquid PFAD additive (as specified in Table 1) were batched and blended. The Megalac® used had a fat (petroleum ether extract) %, free fatty acid % (based on palmitic) and Ca(OH)$_2$% of ca. 5%, ca. 0.2% and ca. 2%, respectively. The PFAD (PT Bukit Kapur Reksa, Indonesia) used had a fat (petroleum ether extract) % and free fatty acid % of ca. 100% and ca. 81% (based on palmitic), respectively. The resultant mash was not pelletized.

Solubility leaching and in-sacco bag study leaching were used to gauge the control release of L-lysine from Megalac®-L-lysine*HCl-additive-based mash (see Table 1).

Characterization—Solubility Leaching. The mash was exposed to a phosphate buffer solution (ca. 0.2 M) at pH ca. 6.7 and at ca. 35° C. with subtle shaking. At 24 h the mash was removed, collected on a filter paper, washed with water and then dried. Mash "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of mash "after exposure")]/(Weight of mash "before exposure")]×100. SIF for Experiment 6 (Table 1)<1%.

In-sacco Bypass (ISB). Not completed due to the low solubility leaching result.

Experiment 6 of Table 1 includes some additional formulation details, processing details, experimental details and efficacy/characterization results. Experiment 6 serves as a representative example for the non-pelleted forms of the formulations described herein.

TABLE 1

Pellet and mash formulation details, efficacy and characterization results.

| Experiment | Die Size | L/D | Ca-fatty acid, % | Free Ca(OH)$_2$ | L-lysine*HCl % | Liquid Reactant Additive, % | Compacted | Feed Temp. (F.) | End Pellet Temp. (F.) | % Bypass (In-house leaching, SIF (24 h)) | % Bypass (In-sacco Bypass ISB (12 h)) |
|---|---|---|---|---|---|---|---|---|---|---|---|
| 1 | 5/32" × 7/8" | 7.3 | Megalac ®, 80 | Yes | 20 | None | Yes, Pellet | 100 | 125 | 15 | 21 |
| 2 | 3/16" × 1" | 5.3 | Megalac ®, 77 | Yes | 20 | Stearic Acid, 3 | Yes, Pellet | 140 | 130 | 38 | 46 |
| 3 | 3/16" × 1½" | 8.0 | Megalac ®, 77 | Yes | 20 | PFAD, 3 | Yes, Pellet | 125 | 160 | 29 | 43 |
| 4 | 3/16" × 1" | 5.3 | Calcium Stearate, 77 | No | 20 | Stearic Acid, 3 | Yes, Pellet | 125 | 112 | 4 | x |
| 5 | 3/16" × 1½" | 8.0 | Megalac ®, 77 | Yes | 20 | Soy Oil, 3 | Yes, Pellet | 130 | 147 | 9 | x |
| 6 | NA | NA | Megalac ®, 77 | Yes | 20 | PFAD, 3 | No, Mash | 100 | NA | <1 | x |

Example VII

Pellet preparation. Calcium salt of palm fatty acid distillate flakes with Ca(OH)$_2$ (Megalac®, Church & Dwight Co., Inc., Princeton, N.J. USA), L-lysine*HCl granules and additive (as specified in Table 2) were batched and blended. The Megalac® used had a fat (petroleum ether extract) %, free fatty acid % (based on palmitic) and Ca(OH)$_2$ % of ca. 5%, ca. 0.2% and ca. 2%, respectively. Liquid stearic acid (Acros Organics N.V., Fair Lawn, N.J.) was then added to the dry blend and blended for 2 minutes. The stearic acid used had a fat (petroleum ether extract) % and free fatty acid % of ca. 100% and ca. 100%, respectively. After mixing, the feed was fed to a CPM CL-3 pellet mill via an auger feeder and pelletized. The resultant pellets were screened to remove fines and cooled via an air blower.

Coating preparation. Stearic acid coating. A stearic acid liquid at ca. 220° F. was spray applied onto the abovementioned pellets (ca. 100° F.) as they tumbled in a candy coater until an ca. 10% (by weight) coating was applied.

Solubility leaching and in-sacco bag study leaching were used to gauge the control release of L-lysine from the uncoated Megalac®-L-lysine*HCl-additive-based pellets and the stearic acid-coated pellets (see Table 2); if the stearic acid coating is effective at mitigating the loss of the L-lysine from the pellet, then elevated L-lysine concentrations in the resultant pellets will result as compared to the uncoated pellet.

Characterization—Solubility Leaching. The pellets were exposed to a phosphate buffer solution (ca. 0.2 M) at pH ca. 6.7 and at ca. 35° C. with subtle shaking. At 24 h the pellets were removed, washed with water and then dried. Pellets "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of pellets "after exposure")/(Weight of pellets "before exposure")]×100. SIF for Experiment 7 and Experiment 8 (Table 2)=28% and 40%, respectively.

In-sacco Bypass (ISB). Pellets housed in nylon bags were placed in the cow's rumen and exposed to the rumen fluid for 12 h. At 12 h, the pellets were removed from the rumen, rinsed with water and then dried. Pellets "before exposure" and "after exposure" were analyzed for N-content (Kjeldahl method) and the % bypass (% remaining)/In-sacco Bypass (ISB), was calculated as follows: ISB=[(N % "after exposure")/(N % "before exposure")]×[(Weight of pellets "after exposure")]/(Weight of pellets "before exposure")]×100. ISB for Experiment 7 and Experiment 8 (Table 2)=55% and 66%, respectively.

Experiment 7 and Experiment 8 of Table 2 include some additional formulation details, processing details, experimental details and efficacy/characterization results.

Example VIII

Pellet preparation. Calcium salt of palm fatty acid distillate flakes with Ca(OH)$_2$ (Megalac®, Church & Dwight Co., Inc., Princeton, N.J. USA), L-lysine*HCl granules and additive (as specified in Table 2) were batched and blended. The Megalac® used had a fat (petroleum ether extract) %, free fatty acid % (based on palmitic) and Ca(OH)$_2$ % of ca. 5%, ca. 0.2% and ca. 2%, respectively. Palm fatty acid distillate (PFAD) liquid was then added to the dry blend and mixed for 2 minutes. The PFAD (PT Bukit Kapur Reksa, Indonesia) used had a fat (petroleum ether extract) % and free fatty acid % of ca. 100% and ca. 81% (based on palmitic), respectively. After mixing, the feed was fed to a CPM CL-3 pellet mill via an auger feeder and pelletized. The resultant pellets were screened to remove fines and cooled via an air blower.

Calcium fatty acid coatings—Method 1. A calcium fatty acid salt slurry was prepared using palm fatty acid distillate and Ca(OH)$_2$. Palm fatty acid distillate (ca. 88% by weight) at ca. 200° F. was added to Ca(OH)$_2$ (ca. 12% by weight) at ca. 80° F. and mixed for ca. 1 minute. The resultant slurry that consisted of newly formed calcium fatty acid salt, palm fatty acid distillate and Ca(OH)$_2$ was then applied onto ca. 70° F. pellets as the pellets tumbled in a drum coater at ca. 38 RPM. An additional charge of Ca(OH)$_2$ was then added to the pellets to complete the calcium fatty acid salt reaction and to separate the pellets. The pellets were tumbled for several minutes until the pellets cooled to about ambient temperature.

Solubility leaching and in-sacco bag study leaching were used to gauge the control release of L-lysine from the uncoated Megalac®-L-lysine*HCl-additive-based pellets and the Ca-fatty acid salt-coated (Method 1) pellets (see Table 2); if the Ca-fatty acid salt coating (Method 1) is effective at mitigating the loss of the L-lysine from the pellet, then elevated L-lysine concentrations in the resultant pellets will result as compared to the uncoated pellet.

Characterization—Solubility Leaching. The pellets were exposed to a phosphate buffer solution (ca. 0.2 M) at pH ca. 6.7 and at ca. 35° C. with subtle shaking. At 24 h the pellets were removed, washed with water and then dried. Pellets "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of pellets "after exposure")]/(Weight of pellets "before exposure")]×100. SIF for Experiment 9 and Experiment 10 (Table 2)=46% and 48%, respectively.

In-sacco Bypass (ISB). Pellets housed in nylon bags were placed in the cow's rumen and exposed to the rumen fluid for 12 h. At 12 h, the pellets were removed from the rumen, rinsed with water and then dried. Pellets "before exposure" and "after exposure" were analyzed for N-content (Kjeldahl method) and the % bypass (% remaining)/In-sacco Bypass (ISB), was calculated as follows: ISB=[(N % "after exposure")/(N % "before exposure")]×[(Weight of pellets "after exposure")]/(Weight of pellets "before exposure")]×100. ISB for Experiment 9 and Experiment 10 (Table 2)=61% and 77%, respectively.

Experiment 9 and Experiment 10 of Table 2 include some additional formulation details, processing details, experimental details and efficacy/characterization results.

Example IX

Pellet preparation. Calcium salt of palm fatty acid distillate flakes with $Ca(OH)_2$ (Megalac®, Church & Dwight Co., Inc., Princeton, N.J. USA), L-lysine*HCl powder/granules and additive (as specified in Table 2) were batched and blended. The Megalac® used had a fat (petroleum ether extract) %, free fatty acid % (based on palmitic) and $Ca(OH)_2$% of ca. 5%, ca. 0.2% and ca. 2%, respectively. Liquid palm fatty acid distillate (PFAD) liquid was then added to the dry blend and mixed for 2 minutes. The PFAD (PT Bukit Kapur Reksa, Indonesia) used had a fat (petroleum ether extract) % and free fatty acid % of ca. 100% and ca. 81% (based on palmitic), respectively. After mixing, the feed was fed to a CPM CL-3 pellet mill via an auger feeder and pelletized. The resultant pellets were screened to remove fines and cooled via an air blower.

Calcium fatty acid coatings—Method 2. A solution containing ca. 50% calcium fatty acid salt and ca. 50% palm fatty acid distillate (PFAD) was prepared; calcium fatty acid salt granules (ca. 80° F.) were added to liquid palm fatty acid distillate (ca. 240° F.) and stirred until the calcium fatty acid salt was solubilized in the palm fatty acid distillate. The resultant solution at ca. 240° F. was then spray-applied (ca. 80 psig) onto ca. 80° F. pellets as they tumbled in a drum coater at ca. 38 RPM. Calcium fatty acid salt powder that contained $Ca(OH)_2$ was periodically applied to the pellets to complete the fatty acid salt reaction and to separate the pellets. The pellets were tumbled for several minutes until the pellets cooled to about ambient temperature.

Solubility leaching and in-sacco bag study leaching were used to gauge the control release of L-lysine from the uncoated Megalac®-L-lysine*HCl-additive-based pellets and the Ca-fatty acid salt-coated (Method 2) pellets (see Table 2); if the Ca-fatty acid salt coating (Method 2) is effective at mitigating the loss of the L-lysine from the pellet, then elevated L-lysine concentrations in the resultant pellets will result as compared to the uncoated pellet.

Characterization—Solubility Leaching. The pellets were exposed to a phosphate buffer solution (ca. 0.2 M) at pH ca. 6.7 and at ca. 35° C. with subtle shaking. At 24 h the pellets were removed, washed with water and then dried. Pellets "before exposure" and "after exposure" were analyzed for N-content (Dumas combustion method) and the % bypass (% remaining)/Solubility Index Factor (SIF), was calculated as follows: SIF=[(Combustion N % "after exposure")/(Combustion N % "before exposure")]×[(Weight of pellets "after exposure")]/(Weight of pellets "before exposure")]×100. SIF for Experiment 11 and Experiment 12 (Table 2)=29% and 47%, respectively.

In-sacco Bypass (ISB). Pellets housed in nylon bags were placed in the cow's rumen and exposed to the rumen fluid for 12 h. At 12 h, the pellets were removed from the rumen, rinsed with water and then dried. Pellets "before exposure" and "after exposure" were analyzed for N-content (Kjeldahl method) and the % bypass (% remaining)/In-sacco Bypass (ISB), was calculated as follows: ISB=[(N % "after exposure")/(N % "before exposure")]×[(Weight of pellets "after exposure")]/(Weight of pellets "before exposure")]×100. ISB for Experiment 11 and Experiment 12 (Table 2)=43% and 72%, respectively.

Experiment 11 and Experiment 12 of Table 2 include some additional formulation details, processing details, experimental details and efficacy/characterization results.

TABLE 2

Pellet and coating experimental details and efficacy/characterization results.

| Experiment | Uncoated Pellet or Coated Pellet | Ca-fatty acid, % | L-lysine*HCl % | Liquid Reactants Additive, % | Die Size | L/D | Feed Temp. (F) | End Pellet Temp. (F) | Coating Details | % Bypass (In-house leaching, SIF (24 h)) | % Bypass (In-sacco Bypass, ISB (12 h)) |
|---|---|---|---|---|---|---|---|---|---|---|---|
| 7 | Uncoated Pellet | 77 | 20 | Stearic Acid, 3 | 3/16" × 1" | 5.3 | 140 | 131 | None | 28 | 55 |
| 8 | Coated Pellet | | | | | | | | "7" Coated with ca. 10% stearic acid | 40 | 66 |
| 9 | Uncoated Pellet | 77 | 20 | PFAD, 3 | 3/16" × 1½" | 8.0 | 120 | 147 | None | 46 | 61 |
| 10 | Coated Pellet | | | | | | | | "9" Coated with ca. | 48 | 77 |

TABLE 2-continued

Pellet and coating experimental details and efficacy/characterization results.

| Experiment | Uncoated Pellet or Coated Pellet | Ca-fatty acid, % | L-lysine*HCl % | Liquid Reactants Additive, % | Die Size | L/D | Feed Temp. (F) | End Pellet Temp. (F) | Coating Details | % Bypass (In-house leaching, SIF (24 h)) | % Bypass (In-sacco Bypass, ISB (12 h)) |
|---|---|---|---|---|---|---|---|---|---|---|---|
| 11 | Uncoated Pellet | 77 | 20 | PFAD, 3 | 3/16" × 1½" | 8.0 | 125 | 160 | 10% Ca-fatty acid (Method 1) None | 29 | 43 |
| 12 | Coated Pellet | | | | | | | | "11" Coated with ca. 10% Ca-fatty acid (Method 2) | 47 | 72 |

What is claimed is:

1. A control release formulation in compacted form comprising: (a) a calcium salt of palm fatty acid distillate, (b) one or more biologically active agents, and (c) a combination of $Ca(OH)_2$ and a binder that is selected from stearic acid and palm fatty acid distillate, wherein a reaction product is formed in-situ between said $Ca(OH)_2$ and said binder.

2. The control release formulation of claim 1 wherein said formulation is compacted and extruded into pellets.

3. The control release formulation of claim 1 wherein said one or more biologically active agents are selected from the group consisting of amino acids, vitamins, minerals, trace elements, enzymes, proteins, non-protein nitrogen compounds, and medicaments.

4. The control release formulation of claim 3 wherein said formulation comprises a single biologically active agent, and wherein said biologically active agent is lysine.

5. The control release formulation of claim 1 wherein said calcium salt of palm fatty acid distillate comprises from about 25 to about 99 weight percent of said formulation.

6. The control release formulation of claim 1 wherein said one or more biologically active agents comprises from about 1 to about 75 weight percent of said formulation.

7. The control release formulation of claim 1 wherein said $Ca(OH)_2$ comprises from about 0.2 to about 10 weight percent of the total weight of the calcium salt of palm fatty acid distillate.

8. The control release formulation of claim 1 wherein said binder comprises from about 0.5 to about 20 weight percent of said formulation.

9. A process for producing a control release formulation comprising: compacting into pellets a control release formulation comprising: (a) a calcium salt of palm fatty acid distillate, (b) one or more biologically active agents, and (c) a combination of $Ca(OH)_2$ and a binder that is selected from stearic acid and palm fatty acid distillate, wherein said binder reacts in-situ with said $Ca(OH)_2$.

10. The process of claim 9, comprising the steps of: (1) blending a particulate of said calcium salt of palm fatty acid distillate containing $Ca(OH)_2$ with one or more biologically active agents and said binder; and (2) compacting and extruding said formulation into pellets.

11. The process of claim 10 wherein said one or more biologically active agents are selected from the group consisting of amino acids, vitamins, minerals, trace elements, enzymes, proteins, non-protein nitrogen compounds, and medicaments.

12. The process of claim 10 wherein said $Ca(OH)_2$ is present from about 0.2 to about 10 weight percent of said particulate of said calcium salt of palm fatty acid distillate.

13. The process in accordance with claim 11 wherein said one or more biologically active agents comprises one or more amino acids selected from the group consisting of alanine, glycine, lysine, methionine, methionine hydroxy analog, tryptophan, arginine, threonine, valine, leucine, isoleucine, histidine, phenylalanine, glutamine and glutamic acid.

* * * * *